2,841,553

LUBRICATING OIL ADDITIVE

Samuel M. Darling, Lyndhurst, and Chien-Wei Liao, Cleveland, Ohio, assignors to The Standard Oil Company, Cleveland, Ohio, a corporation of Ohio No Drawing. Application December 24, 1956
Serial No. 630,050

8 Claims. (Cl. 252—32.7)

This invention relates to lubricating oil additives having improved dispersancy and viscosity-index improving properties, and to the improved lubricants obtained thereby.

The lubricating oil additive of the invention has a complex structure which can be defined as follows:

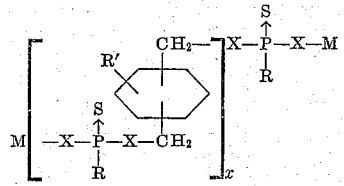

where R' is an alkyl radical or a plurality of alkyl radicals having in total from one to three carbon atoms, R is an alkenyl radical of the type $C_nH_{2n-1}$ where $n$ has the value of eight to twenty-two, $x$ has a value within the range from two to ten, X is selected from the group consisting of sulfur and oxygen, and at least one X is oxygen, and M is an alkali metal such as potassium, sodium, or lithium. Thus, the R radicals can be methyl, ethyl, propyl, and isopropyl, and there can be from one to three methyl radicals or one methyl and one ethyl radical. The $C_nH_{2n-1}$ radical can be, for instance, dodecenyl, hexadecenyl, pentadecenyl, octadecenyl, and nonenyl, either straight or branched. The long chain alkenyl radical is necessary in order to solubilize the condensation product in petroleum lubricating oils.

It is apparent from the above that the lubricating oil additive of the invention is a polymer, and because of its polymeric nature it has been found to function as a viscosity-index improver. In addition, the presence of the metal imparts detergency and the

group imparts antioxidant properties.

The following are typical additives in accordance with the invention:

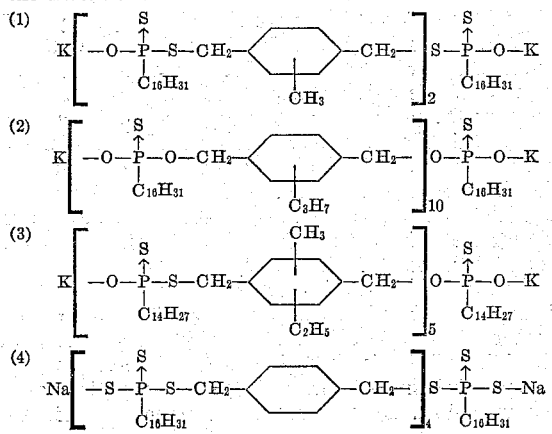

The product is prepared by reacting an olefin of the type formula $C_nH_{2n}$ with phosphorus pentasulfide at an elevated temperature with nitrogen stripping. Hydrogen sulfide is evolved in the reaction. The resulting product is the alkenyltrithiophosphonic thioanhydride:

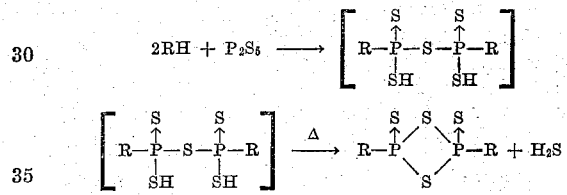

This material is reacted with potassium hydroxide to prepare potassium alkenyldithiophosphonate:

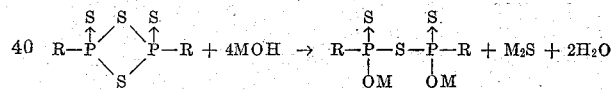

This is separated from the excess olefin resulting from the first reaction by reacting it with a slight excess of potassium hydroxide and extracting the soluble thiophosphonate with water. The aqueous solution is then acidified with a mineral acid, such as hydrochloric or sulfuric acid, and extracted with ether. The product is recovered by neutralizing the ether solution with alcoholic potassium hydroxide and vacuum stripping:

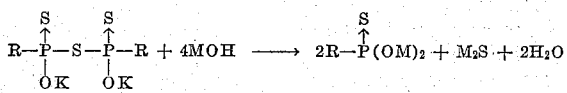

The potassium alkenyldithiophosphonate is reacted with a dichloromethyl alkyl benzene of the type shown in the formula:

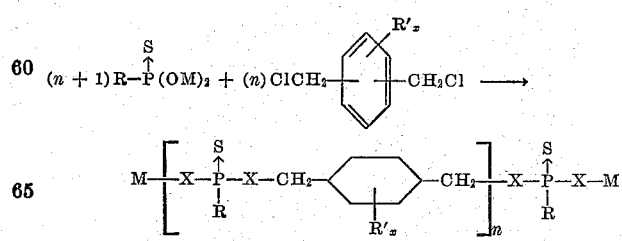

The reaction can be carried out in ethanol or in dibutyl carbitol at an elevated temperature within the range from 50 to 200° C. for a sufficient period of time to permit completion of the condensation. The fraction which is obtained is soluble in ether, benzene, and hydrocarbon oils and insoluble in methanol and ethanol. This appears as a gelatinous brown resin after drying in vacuum at low temperature below about 50° C.

It has been determined by infrared absorption spectra and chemical analysis that the product has the structure outlined above. Infrared examination shows the absence of the starting materials, and confirms the presence of the long alkyl groups and the P—O—C aliphatic groups. The P—→ S group, normally a weak absorption, was not detected by the infrared spectra, but it is apparent that the sulfur could be nowhere else in the molecule, the general composition of which has been confirmed by analysis for sulfur, phosphorus and potassium, and molecular weight.

A sample of the product prepared as shown below where $x$ has the value of 2 and M is potassium was found to have a sulfur content of 10.8%, phosphorus 6.1%, potassium 6.8% and a molecular weight in excess of 1000. The calculated values for the product according to the formula are sulfur 10.8%, phosphorus 6.9%, potassium 6.7%, molecular weight 1174. This is a very close correspondence, and confirms the structure which has been given above.

Any aliphatic olefin having from eight to twenty-two carbon atoms may be used in the preparation of the product of the invention, for example, propylene trimer, tetramer, heavy motor polymer, dibutylenes, polybutylenes, or olefin hydrocarbons, such as hexadecene, octadecene, dodecene, and tetradecene.

The additives of the invention can be employed to improve any petroleum hydrocarbon oil of lubricating viscosity. The SAE viscosities for lubricating oil range from Nos. 10 to 70. Oils having SAE Nos. 10 to 40 have a viscosity within the range from 90 to 255 SSU at 130° F., and oils having SAE Nos. 40 to 70 have a viscosity within the range from 80 to 150 SSU at 210° F. The acid-treated and solvent-extracted oils are equally useful in the compositions of the invention. The oils may be blended from finished neutral oils of light and heavy viscosities, and may include bright stocks and any other conventional additives. It is impossible here to give a complete description of the various methods used in the preparation of lubricating oils, but reference is made to the text by Georgi entitled Motor Oils and Engine Lubrication, published by Reinhold Publishing Corp., N. Y. (1950) (chapter V), wherein the various types of lubricating oils are discussed fully. Any of the oils mentioned therein can be employed in the composition of the invention.

Very small amounts of the lubricating oil additive to the invention will give a marked improvement in the dispersancy and viscosity-index of the oil. As little as 0.1% is effective. Amounts between 0.5% and 5% are preferred.

The chloromethylated alkyl benzenes required in the preparation of the compound of the invention can be prepared by standard procedures known to those skilled in the art.

The following examples in the opinion of the inventors represent the best embodiments of their invention:

EXAMPLE 1 n-Hexadecene-1, 1346 g. (6 moles) and phosphorus pentasulfide, 666 g. (3 moles), were heated at the reflux temperature in mixed xylene for from three to five hours, after which the solvent was removed by stripping, yielding a homogeneous, thick, syrupy liquid product. Analysis of the product indicated the following:

| Percent Phosphorus | | Percent Sulfur | | Mol. Wt. | |
|---|---|---|---|---|---|
| Calcd | 9.75 | Calcd | 20.1 | Calcd | 637 |
| Found | 9.09, 9.16 | Found | 21.2, 21.4 | Found | 756, 776 |

636 g. (1 m.) of the stripped intermediate were reacted with the theoretical amount 8 moles of potassium hydroxide (527 g. 85% pellets) in 1200 g. of water. The reaction mixture was heated at 70–90° C. for approximately thirty hours. Thereafter, the aqueous mixture was acidified by addition of approximately 900 ml. of concentrated hydrochloric acid, thus removing potassium sulfide as hydrogen sulfide. The organic layer thus liberated was taken up with about 250 ml. of ethyl ether. The ether solution obtained above was neutralized with 132.3 gms. of 85% potassium hydroxide pellets in 250 ml. H₂O to a pH of 7–8. The potassium soap was recovered by separating the ether layer from the mixture and removing the water to obtain the crude product, which was then washed with ether to extract any organic contaminants. Centrifuging was used to separate the ether wash from the product. The yield was approximately 55% of theoretical. After drying, the soap analyzed as follows:

| | potassium | phosphorus | Sulfur |
|---|---|---|---|
| Percent Calcd. for $C_{16}H_{31}O_2SPK_2$ | 19.7 | 7.83 | 8.1 |
| Percent Found | 20.5 | 10.18 | 7.8 |

The product, 226 g. (0.572 mole), was heated in dibutyl carbitol (270 gms.) with 118 g. (0.545 mole) of a mixture of dichloromethyl methyl ethyl benzene and dichloromethyl trimethyl benzene in approximately equal quantities. The mixture was refluxed at 140–160° C. for a total of five hours. A salt-like insoluble material formed, which was KCl, was separated by filtration. A homogeneous solution of the desired product was obtained in the dibutyl carbitol. The solvent was removed by vacuum distillation. The additive was obtained in 93% yield, analyzing as follows:

Mol. Wt. 2163; potassium 4.36%; phosphorus 9.7%; sulfur 4.81%; chlorine 0.86%

The product was dissolved in a lubricating oil (a blend of 95% solvent-extracted neutral distillate, 100 SSU at 100° F., and 5% of a solvent-extracted bright stock, 250 SSU at 210° F.) to form 1.4 and 5% solutions in the oil, respectively. These products were then tested against a control of the base oil alone. The percent sulfated ash, dispersancy, water-tolerance, and Polyveriform test results also were determined, and the following data were obtained:

*Table I*

| | | | Base Oil (Control) |
|---|---|---|---|
| Percent Additive | 1.4 | 5.0 | 0 |
| Percent Sulfated ash | 0.2 | 0.64 | 0 |
| Dispersancy, g. carbon | 3.0 | 5.4 | 0 |
| Water tolerance, ml | 30–35 | 60–70 | 0 |
| Polyveriform test—Vis. Inc. at 100° F., SUS | | 24.6 | 113.1 |

The Polyveriform Test is described in a paper by R. E. Burk, E. C. Hughes, W. E. Scovill, and J. D. Bartleson, presented at the Atlantic City Meeting of the American Chemical Society in September 1941, and in another paper by the same authors presented at the New York City Meeting of the American Chemical Society in September 1944, published in Industrial and Engineering Chemistry, Analytical Edition, vol. 17, No. 5, May 1945, pages 302–309. The latter paper also correlates the results of the Polyveriform Test with the full scale standardized "Chevrolet Engine Test."

The dispersancy test is a measure of the ability of the oil to hold carbon black dispersed. The oil to be tested is made up as a 5% solution thereof in benzene, and 100 ml. of the solution is placed in a glass stoppered graduate. Carbon black in increments of 0.2 gm. is added to the solution, which is then shaken for fifteen seconds and permitted to stand for five minutes in front of a light source and the contents observed for a "break point." This point is seen as a thin upper layer of completely transparent liquid containing no carbon black particles. If no break point is observed, additional increments of carbon black are added until there is a break point. The largest amount of carbon black which does not produce a break point is recorded as the result of the test. The test has been calibrated against various additive concentrations of dispersant additives in oil and is a measure of the dispersant or detergent properties of an oil.

The water tolerance test is an extension of the test previously described, and the solution of the oil is made up in the same way and has added to it an amount of carbon black equal to the dispersancy rating. Distilled water is then added in 10 ml. increments, and after each addition the graduate is stoppered and shaken for fifteen seconds and allowed to stand five minutes. After this time, the suspension is similarly observed for a break point, and if none is observed an additional 10 mil. of water is added. This is continued until a break point is noted. The water tolerance test is important since an additive must not only have dispersant action in a dry oil but also in the presence of water, because a crankcase in the winter often contains water as a result of condensation.

In Table I it will be noted that at 5% concentration the oil has a dispersancy rating of 5.4 and a water tolerance of 60–70. Merely for the purposes of comparison, an oil with 5% of a commercial detergent additive of the barium sulfonate type was compared. This oil had a dispersancy rating of 3.6 and a negative water tolerance test, i. e., the addition of the first 10 ml. of water produced a break point.

EXAMPLE 2

REACTION OF n-HEXADECENE-1 AND PHOSPHORUS PENTASULFIDE TO FORM THE ALKENYLTHIOPHOSPHONATE ANHYDRIDE n-Hexadecene-1 (B. P. 145–52° C./7–8 mm., $n_D^{25}$, 1.4392–8), 224.4 g. (1 mole, 400% excess) and phosphorus pentasulfide (22.2 g., 0.1 m.) were heated at 150° C. (approximately 300° F.) with nitrogen stripping and stirring for two hours. The hydrogen sulfide evolved was absorbed in a zinc sulfate-ammonium hydroxide aqueous solution in order to measure the amount evolved. The reaction mixture was then stirred at room temperature overnight. It was decanted, and no solid remained. A dark solution was obtained.

In the ZnSO$_4$—NH$_4$OH absorption tower, a white solid was precipitated out. The latter was filtered and was found to weigh approximately 2 g. and insoluble in ammonium hydroxide. One-tenth of the filtrate was evaporated to dryness, yielding a white solid. About one-tenth of the filtered while solid obtained previously was intimately mixed with the solids obtained from evaporation of one-tenth filtrate. The combined solid was analyzed for sulfur as sulfide:

Calcd. S: approximately 11%. Found: 11.1, 11.0%.

REACTION OF THE ALKENYLTRITHIOPHOSPHONIC THIOANHYDRIDE WITH POTASSIUM HYDROXIDE 180 ml. of the alkenyltrithiophosphonic thioanhydride reaction mixture, equivalent to 39.6 g. of RPS$_4$PR (0.0622 mole) 111 g. of RH (0.497 mole), 41.8 g. potassium hydroxide (0.747 mole) or 49.3 g. 85 percent potassium hydroxide, and 50 g. water were refluxed for approximately seven hours. 700 ml. of water was added to the reaction mixture. The acidification of the aqueous solution was carried out with approximately 55 ml. concentrated hydrochloric acid. The organic layer liberated was taken up with about 250 ml. ethyl ether. The ether solution was then mixed with 250 ml. of absolute ethyl alcohol. The ethyl ether-ethyl alcohol mixture was distilled under vacuum to eliminate the ether. The ethyl alcohol solution which resulted was then neutralized with 30 ml. of an alcoholic potassium hydroxide solution (52 g./200 ml. solution). The resulting ethyl alcohol solution was alkaline and a heavy, dark oil separated at the bottom of the container (weighing about 39 g.). The di-potassium salt of the alkenyl thiophosphonic acid was calculated to be equivalent approximately to 45% of theoretical.

In order to have the acid-salt unit at the ends of the prospective polymer chain, a slight excess of 5% of the potassium salt was used. This was based on the calculated amount of potassium salt, as derived from the amount of alcoholic potassium hydroxide solution used in the second neutralization step, following the acidification step to separate other organic materials.

REACTION OF POTASSIUM HEXADECENYLTHIOPHOSPHONATE WITH DICHLOROMETHYL TRIMETHYL BENZENE

The calculated amount of di(chloromethyl) derivatives of isomers of trimethyl benzene as described in Example 1 (11.5 g. 0.053 mole) was added to the ethyl alcohol of potassium hexadecenyl thiophosphonate solution obtained above (containing the equivalent of 0.056 mole of the potassium salt). The mixture was refluxed for a total of five and one-half hours. The heterogeneous product mixture was filtered. The filtrate was found to be slightly acidic. Therefore it was neutralized with 15 ml. of an alcoholic potassium hydroxide solution (52 g./100 ml. solution). The neutralized ethyl alcohol solution was then vacuum distilled to eliminate the ethyl alcohol, and the small amount of water of neutralization in it. A viscous, heavy, dark liquid was obtained.

(Solubilities: s. ether, pentane, sl. s. MeOH.)

The latter was washed with water to eliminate the

present from the last neutralization, leaving a viscous organic layer which was then dried with anhydrous MgSO$_4$.

The clear, dark ether solution (containing the products) was then vacuum stripped to eliminate the ethyl ether. The residue, a thick, dark liquid, was washed ten times with 50 ml. of MeOH. The washed, dark liquid was then washed ten times with 50 ml. of absolute ethyl alcohol, leaving a heavy dark substance. The latter was again taken up in ethyl ether and the ethyl ether solution subjected to vacuum distillation to eliminate the solvents. A gelatinous, brownish material was obtained after drying the residue at about 30–40° C./high vacuum overnight. This gelatinous substance weighed approximately 14 g. and was found to be soluble in ethyl ether and neutral oils. It melted between 170 and 190° C., giving negative Beilstein test for halogens.

A sample of this gelatinous product was analyzed for the following:

| | Cl | S | P | K | M. W. |
|---|---|---|---|---|---|
| Percent Found | <0.2 | 10.88, 10.66 | 6.07, 6.20 | 6.79 | greater than 1,000. |

(Percent SO$_4$=ash, 15.1)

The product was incorporated in an S. A. E. 20 lubricating oil made from solvent-extracted Mid-Continent crude in an amount of 3% and found to have similar anti-oxidant, water-tolerance and dispersancy properties as described in Example 1.

Other modifications of the invention will be obvious to one skilled in the art within the scope of the following claims.

We claim:

1. A mineral lubricating oil containing an amount to improve the dispersancy and viscosity index of the oil within the range from 0.1 to 5% by weight of the oil of a lubricating oil additive having the structure:

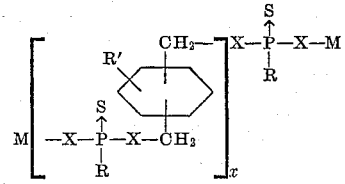

where M is an alkali metal, X is selected from the group consisting of sulfur and oxygen and at least one X is oxygen, R is an alkenyl radical having from eight to twenty-two carbon atoms, R' is selected from the group consisting of from one to three alkyl radicals having in total from one to three carbon atoms, and $x$ has a value within the range from two to ten and represents the average number of such units in the molecule.

2. A mineral lubricating oil in accordance with claim 1 in which R is a hexadecenyl radical.

3. A mineral lubricating oil in accordance with claim 2 in which all of the X atoms are oxygen.

4. A mineral lubricating oil in accordance with claim 3 in which M is potassium.

5. A lubricating oil additive having the characteristic of improving dispersancy and viscosity index of petroleum lubricating oils, having the structure:

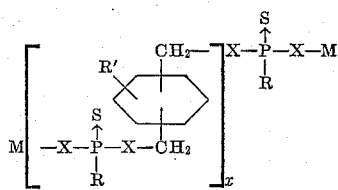

where M is an alkali metal, X is selected from the group consisting of sulfur and oxygen and at least one X is oxygen, R is an alkenyl radical having from eight to twenty-two carbon atoms, R' is selected from the group consisting of from one to three alkyl radicals having in total from one to three carbon atoms, and $x$ has a value within the range from two to ten and represents the average number of such units in the molecule.

6. A lubricating oil additive in accordance with claim 5 in which R is a hexadecenyl radical.

7. A lubricating oil additive in accordance with claim 6 in which all of the X atoms are oxygen.

8. A lubricating oil additive in accordance with claim 7 in which M is potassium.

References Cited in the file of this patent
UNITED STATES PATENTS

| | | |
|---|---|---|
| 2,266,514 | Romieux | Dec. 16, 1941 |
| 2,316,080 | Loane et al. | Apr. 6, 1943 |
| 2,497,132 | Mikeska | Feb. 14, 1950 |
| 2,642,461 | Morris et al. | June 16, 1953 |
| 2,645,657 | Rudel et al. | July 14, 1953 |